United States Patent
Heise (10) Patent No.: US 12,112,631 B2
(45) Date of Patent: Oct. 8, 2024

(54) METHOD AND PARKING GUIDANCE SYSTEM FOR ASSIGNING A PARKING SPACE FOR A VEHICLE AND FOR NAVIGATING THE VEHICLE TO THE PARKING SPACE

(71) Applicant: Graphmasters SA, Zürich (CH)

(72) Inventor: Sebastian Heise, Rahden (DE)

(73) Assignee: Graphmasters SA, Zürich (CH)

(*) Notice: Subject to any disclaimer, the term of this patent is extended or adjusted under 35 U.S.C. 154(b) by 0 days.

(21) Appl. No.: 17/959,675

(22) Filed: Oct. 4, 2022

(65) Prior Publication Data
US 2023/0107149 A1    Apr. 6, 2023

(30) Foreign Application Priority Data
Oct. 5, 2021    (DE) ..................... 10 2021 125 861.8

(51) Int. Cl.
| G08G 1/14 | (2006.01) |
| G01C 21/34 | (2006.01) |
| G01C 21/36 | (2006.01) |

(52) U.S. Cl.
CPC ......... *G08G 1/143* (2013.01); *G01C 21/3492* (2013.01); *G01C 21/3685* (2013.01)

(58) Field of Classification Search
CPC .............. G08G 1/143; G08G 1/0112; G08G 1/096844; G08G 1/0129; G08G 1/148;
(Continued)

(56) References Cited

U.S. PATENT DOCUMENTS

| 2008/0033640 A1 | 2/2008 | Amano |
| 2013/0265174 A1* | 10/2013 | Scofield ................. G08G 1/146 340/932.2 |

(Continued)

FOREIGN PATENT DOCUMENTS

| DE | 10 2007 059 761 A1 | 6/2009 |
| DE | 10 2009 054 292 A1 | 8/2011 |

(Continued)

OTHER PUBLICATIONS

Office Action issued in German Patent Application No. 10 2021125 861.8, dated Jun. 7, 2022, 12 pp.

*Primary Examiner* — Ryan W Sherwin
(74) *Attorney, Agent, or Firm* — Dilworth IP, LLC (57) ABSTRACT

A parking guidance system and a method for allocating a parking space for a vehicle and for navigating the vehicle to the parking space are provided. The system has a detection unit for detecting an occupancy state of a parking space and/or a parking area containing a plurality of parking spaces, at least one mobile terminal with which a request from at least one vehicle driver for a parking space for his vehicle to reach a destination can be transmitted to the parking guidance system, which request comprises instantaneous position data of the vehicle. The parking guidance system is designed to select an available parking space in accordance with the request and to transmit a selection suggestion for a parking space to the mobile terminal and comprises a navigation system designed to determine a route from the location of the vehicle at the time of the parking space request to the available parking space. The parking guidance system is designed to select parking spaces in a manner that is fed back to the route guidance.

16 Claims, 10 Drawing Sheets

(58) Field of Classification Search
CPC ............... G08G 1/0141; G08G 1/0145; G01C 21/3492; G01C 21/3685
See application file for complete search history.

(56) References Cited

U.S. PATENT DOCUMENTS

| | | | | |
|---|---|---|---|---|
| 2015/0039211 A1* | 2/2015 | Stefan | ................ | B62D 15/0285 |
| | | | | 701/117 |
| 2015/0123818 A1* | 5/2015 | Sellschopp | ...... | G08G 1/096844 |
| | | | | 340/932.2 |
| 2015/0219463 A1* | 8/2015 | Kang | ................ | G01C 21/3691 |
| | | | | 340/932.2 |
| 2017/0144654 A1* | 5/2017 | Sham | ..................... | G08G 1/148 |
| 2018/0313660 A1* | 11/2018 | Eyster | ................ | G01C 21/3685 |
| 2019/0130764 A1* | 5/2019 | Karani | ................ | G01C 21/3461 |
| 2022/0092979 A1* | 3/2022 | Gambella | .......... | G01C 21/3685 |

FOREIGN PATENT DOCUMENTS

| | | |
|---|---|---|
| DE | 10 2016 013 804 A1 | 5/2017 |
| DE | 10 2017 203 845 A1 | 9/2018 |
| EP | 2 309 472 A2 | 4/2011 |
| EP | 2 713 354 A1 | 4/2014 |
| WO | 2011/061028 A1 | 5/2011 |

\* cited by examiner

Fig. 9

METHOD AND PARKING GUIDANCE SYSTEM FOR ASSIGNING A PARKING SPACE FOR A VEHICLE AND FOR NAVIGATING THE VEHICLE TO THE PARKING SPACE

CROSS-REFERENCE TO RELATED APPLICATIONS

This patent application claims priority under 35 U.S.C. § 119 to German Patent Application No. 10 2021 125 861.8, filed on Oct. 5, 2021. The disclosure of this patent document is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to a method for allocating a parking space for a vehicle and for navigating the vehicle to the parking space as well as to a parking guidance system for allocating a parking space for a vehicle and for navigating the vehicle to the parking space.

2. Description of Related Art

This description of related art is provided to generally present the context of the present invention. Unless otherwise indicated, the information described in this section are not prior art to the claimed invention of this patent document and are not admitted to be prior art by inclusion therein.

Generally speaking, systems and methods are known for assigning a parking space to a vehicle. In city centers, the assignment of a parking space to a vehicle is still done in a simple way with the help of display panels that show existing parking garages or parking areas, their location, and the number of available parking spaces. In this way, road users are directed to free parking spaces.

In addition, instead of display panels, mobile (radio) applications are also used in such systems to display information on the location and occupancy of parking garages or parking areas and to guide road users to them.

In detail, European Patent No. EP 2 309 472 A2 relates to a parking guidance system for a parking area, in particular at service stations and/or rest areas on freeways, with parking space markings for marking parking spaces of at least two different sizes, the respective parking space sizes being matched in particular to the space requirements of cars and trucks, and a method for operating such a parking guidance system. It is proposed that the respective parking space sizes be variably matched to the space requirements of cars and trucks, wherein at least some of the parking space markings can be switched on and off electronically in such a way that a different number of parking spaces of at least two sizes can be variably displayed, and at least some of the parking area can be selectively subdivided into a larger number of parking spaces of smaller size or into a smaller number of parking spaces of larger size by switching over the variable parking space markings.

European Patent Application No. EP 2 713 354 A1 describes a parking guidance system for a traffic route network with at least one parking area in which parking spaces for vehicles are arranged on public traffic routes. The parking guidance system has payment devices for paying parking fees, an evaluation device for detecting the occupancy status of the parking spaces and information devices for outputting a detected parking space occupancy to drivers looking for a parking space. A payment device is formed by a terminal carried by the driver, which has a locating unit for determining the current position and a communication unit for wireless data transmission. The terminal is set up to pay a parking fee for a parking space in communication with a billing center.

The evaluation unit is in communication with the billing center and is set up to determine a parking space occupancy for the parking area based on the position of the terminal device and the time and amount of the parking fee payment. This is said to improve the quality of the determined parking space occupancy and thus reduce parking search traffic.

German Patent Application No. DE 10 2016 013 804 A1 also describes a method for operating a parking guidance system with several participating vehicles and associated vehicle drivers. In the case of a vehicle parked in a parking space, the behaviour of the associated vehicle driver is used to determine the expected time at which the parking space will be vacated, and this time is communicated to another vehicle driver or his vehicle.

Predictions about the future release of parking spaces occupied by a vehicle are made and communicated to other drivers or their vehicles so that they can use the parking space that will become free in the future for parking. This is said to counteract situations in which a vacant parking space is not taken into account when searching for a parking space using a parking guidance system. The application claims this leads to a shortened search time for parking spaces and, accordingly, to increased convenience for the vehicle driver. In addition, the volume of traffic is said to be reduced because shorter distances have to be covered when searching for a parking space. In addition, the application claims this leads to a higher utilization of parking spaces or parking garages.

Finally, German Patent Application No. DE 10 2009 054 292 A1 discloses a method for searching and controlling a parking space for a vehicle with a device for sending a parking space request and/or a parking space release to a parking guidance system and for receiving parking space information by the parking guidance system, wherein the parking guidance system manages the parking space occupancy of an area, wherein the parking space request comprises the current position of the vehicle and the destination, wherein the parking space release comprises the position of the parking space, and wherein the parking space information comprises the position of a destination parking space. The application claims this reduces the time to search for a parking space and the travel distance to the parking space. The application claims this leads to a relaxed parking space search for the driver and reduces the pollutant emission of the vehicle (e.g., passenger car). Furthermore, the application claims the process can be carried out without additional major infrastructure. For example, sensors that detect parking space occupancy can be dispensed with. The method is said to enable a collaborative parking guidance system, with which cars (e.g., passenger cars) release parking spaces to each other. With the help of localization devices in the cars, which are connected to a central parking guidance system, e.g., via the Internet, the participants inform each other where they are looking for a parking space or that they have left the parking space.

Even if more convenient mobile (radio) applications are used in parking guidance systems to display location and occupancy information of parking garages or parking spaces, perceived deficiencies in conventional systems and methods are that the behaviour of several road users can adversely affect the traffic situation and efficient parking space occupancy. For example, an oscillatory condition can result from many road users simultaneously heading for one or more of the same available parking spaces, which can lead to traffic congestion or at least disruption of traffic flow. Similarly, a full occupancy indication of a parking space can lead to the parking space not being approached by road users even for a longer period of time than it is already able to accommodate. This is referred to as resonance effects.

Accordingly, at least some aims of the present invention is to provide improved systems and methods that avoid, as far as possible, oscillatory states of the traffic flow or resonance effects of the traffic flow caused by the individual behaviour of numerous road users, which is influenced by information about an instantaneous traffic situation to positively influence vehicle journey times and/or routes and to increase the efficient parking space occupancy.

SUMMARY OF THE INVENTION

The present invention resides in systems and methods as set forth in the independent claims, with embodiments described in the dependent claims.

In one aspect of the present invention is provided a method for allocating a parking space for a vehicle and for navigating the vehicle to the parking space. In the method, in response to a request sent to a parking guidance system by at least one vehicle driver for a parking space for his/her vehicle to reach a destination, which request comprises the position data of the vehicle, a corresponding selection of an available parking space is carried out and the available parking space is suggested to the at least one vehicle driver. The method then determines a route with the aid of a navigation system assigned to the parking guidance system from the location of the vehicle at the time of the parking space request to the available parking space, and the at least one vehicle driver is navigated along the determined route to the available parking space. The method is characterized by the fact that the parking space selection and the route guidance are fed back to each other. That is, both updates as to traffic and space occupancy lead to a response and an updated route proposed by navigation system.

For example, in one embodiment, navigation to a selected first parking space (PS1) or destination to be advantageous reached in time is to begin with along a first travel route (TR1). As changes in occupancy at the parking place (PS1) occur, a new second parking space (PS2) may be chosen causing the travel route to be changed as well to a second travel route (TR2). If there is traffic congestion on the first travel route (TR1), or for instance on the new second travel route (TR2), the second travel route (TR2) may be changed to a third travel route (TR3). If it turns out that either it is not convenient to direct the vehicle to the new second parking space (PS2) using new third travel route (TR3) or even impossible to approach the second parking space (PS2), the system looks for still another new third parking space (PS3) and directs the car to third parking space (PS3). Also, if another fourth parking space (PS4) becomes available along the newly chosen third travel route (TR3), it may be used instead of second parking space (PS2). Accordingly travel route and parking space may be chosen interdependently via this fed back functionality.

In another aspect of the present invention is provided a parking guidance system for assigning a parking space to a vehicle and for navigating the vehicle to the parking space, in particular for carrying out the method according to the first aspect. The parking guidance system having a detection unit for detecting an occupancy state of a parking space or parking spaces and/or a parking area containing a plurality of parking spaces, having at least one mobile terminal with which a request from at least one vehicle driver for a parking space or parking space for his/her vehicle to reach a destination can be transmitted to the parking guidance system, which request comprises instantaneous position data of the vehicle. The parking guidance system is designed to select an available parking space in accordance with the request and to transmit a selection proposal for a parking space to the mobile terminal and comprises a navigation system which is designed to determine a route from the location of the vehicle at the time of the parking space request (e.g., the vehicle's origin) to the available parking space (e.g., the vehicle's destination). The parking guidance system is characterized in that it is designed for a parking space selection that is fed back with the route guidance. For example, within the parking guidance system the selection of a parking space is interrelated with route guidance such that the selection of a parking space and route guidance are in a reciprocal relation.

According to aspects of the invention, a parking space selection is not made independently of a route guidance. Data on parking space selection and route guidance (e.g., for a vehicle's origin to its destination through one or more intermediate points) with regard to parking space occupancy and traffic load of a route according to the routing of the vehicle are fed back to each other or adapted to each other. During the routing of the vehicle to the proposed parking place, the parking place selection is checked depending on the traffic load of the route according to the routing and is changed in case of an unacceptable, heavy traffic load. Likewise, if the initially suggested or selected parking space is already fully occupied or will be fully occupied at the calculated time of arrival of the vehicle, the routing of the vehicle is changed in order to drive to another available parking space. The method or parking guidance system is usually used to guide at least some road users, for example, in a centralized and collaborative manner by finding optimal solutions (e.g., parking space occupancy and route guidance) for the road users, as a whole.

It is within the scope of the present invention for the parking space selection to be checked with regard to availability and time-conform accessibility on the basis of the actual traffic situation on the route to the parking space suggested by the parking guidance system. In the event of a negative change in the traffic situation, which does not ensure that the destination can be reached by the driver at the desired time, the routing can be adapted or changed and/or a different parking space, which ensures that the destination can be reached at the desired time, can be selected and suggested to the driver. Furthermore, in the event of an unpredictable occupancy of the parking space assigned to the driver, to which the driver is navigated according to the invention, preferably another parking space available at the requested time is selected and assigned to the driver and the driver is guided to this other parking space via the navigation system of the parking guidance system.

The invention has the advantage that the overall traffic situation is optimized as far as possible in terms of parking space utilization or occupancy and route capacity. Further advantages may be realized by the present invention.

In one embodiment of the method according to the invention or in one embodiment of the parking guidance system according to the invention, sensors detect an occupancy status of a parking space and/or of a parking area containing at least one parking space. The parking space occupancy can be determined by counting systems based on exit-entry differential measurement or on ultrasound, radar, or laser measurements. Likewise, optical cameras, satellites, or radio frequency identification (RFID) technology (identification by means of electromagnetic waves) can be used to measure the occupancy of parking spaces or parking areas.

It is within the scope of the present invention to use estimates to determine, for example, how many parking spaces are available in a parking area whose size is at least approximately known. Here, a length of preferably six meters (6 m; 19.7 ft) and usual width of a parking space required for a vehicle are assumed.

In a preferred embodiment of the method according to the invention or a preferred embodiment of the parking guidance system according to the invention, the parking space selection and route guidance are updated and adapted to each other accordingly. Preferably, the parking space selection and the route guidance are mutually adapted to each other after an update. The updating and/or the adaptation can be carried out continuously or at predefinable time intervals.

In the method or parking guidance system according to embodiments of the invention, an arrival time at the destination can be specified with the request for a parking space. The navigation system then determines an estimated time of arrival at the available parking space during the vehicle's route guidance and checks its availability at the estimated time of arrival during the vehicle's route guidance to the selected parking space. If the preset arrival time at the destination is exceeded by the estimated arrival time at the destination, the route guidance by the navigation system is changed accordingly and/or another parking space available at the estimated arrival time is selected and the vehicle is navigated to the other available parking space.

In another embodiment of the method according to aspects of the present invention or in another embodiment of the parking guidance system according to aspects of the present invention, an arrival time at the destination is specified with the request for a parking space and an estimated arrival time at the available parking space is determined by the navigation system during the routing of the vehicle. The availability of the selected parking space at the time of the estimated time of arrival is checked and, in the event of non-availability, another parking space is selected by the traffic guidance system, an estimated time of arrival is determined and the availability of the other parking space at the estimated time of arrival is checked. If it is available, the vehicle is navigated to the other parking space, and if the other parking space is not available, another parking space is selected until a parking space that is available at the corresponding time is determined.

A still different embodiment of the method according to aspects of the present invention or embodiment of the parking guidance system according to aspects of the present invention is characterized by the fact that other road users who can be influenced by the parking guidance system (e.g., are subscribers to a provided services) and/or are independent of it (e.g., are not subscribers to the service) are taken into account in the selection of parking spaces and/or routing. The behaviour of road users who can be influenced by the parking guidance system can be used to estimate or extrapolate the behaviour of road users who are independent of the parking guidance system.

In a further embodiment of the method or embodiment of the parking guidance system according to aspects of the present invention, the parking space selection and/or the routing is carried out taking into account an estimated or predicted behaviour of a plurality of road users. The estimated, projected, forecasted, predicted, or prognosed behaviour of a plurality of road users may be taken into account. The estimate, projection or the like may be based on statistical data or otherwise obtained traffic data. The individual or plurality of road users may include road users not guided by a parking guidance system (e.g., subscribers and/or non-subscribers).

It is within the scope of the present invention for the parking guidance system to calculate or predict a parking space utilization of the parking areas on the basis of positions of the guided vehicles and their local and temporal parking space requirements. In one embodiment, the behaviour of such vehicles that are independent of the parking guidance system is also taken into account. The behaviour of non-guided vehicles can be determined, for example, on the basis of statically determined data or predicted on the basis of historical traffic behaviour. The consideration of the vehicles or road users independent of the parking guidance system can be done by an adjustment or recalculation of the parking requirements including the traffic load on routes proposed to reach the parking areas.

In one embodiment, additional information is taken into account by the parking guidance system when selecting parking spaces and routing to the selected parking space, including weather conditions, an event calendar, public holidays, statistically determined traffic conditions by day of the week or time of day, and/or other events.

In a further embodiment of the method according to the invention or further embodiment of the parking guidance system according to the invention, the behaviour of other road users not guided by the parking guidance system or method according to the invention is taken into account. In this context, the behaviour of these road users is inferred on the basis of, among other things, movement profiles of smartphones. Likewise, statistical models based on shopping behaviour, parking behaviour, an amount of parking fees paid, and the like can be used to be able to take into account the traffic behaviour of road users not guided by the parking guidance system or method according to the invention. In an adaptation of statistical models or statistics for use with the parking guidance system or method according to the invention, artificial intelligence (AI) based systems may be employed.

A further embodiment of the method according to the invention or a further embodiment of the parking guidance system according to the invention is characterized in that, in the case of an assignment of a parking space and a routing therein, a remaining travel time is determined for a plurality of vehicles during the routing to the respectively selected parking space and, in the case of negative changes in the traffic situation and/or a changing parking space availability, the routing and/or parking space selection is changed. In one embodiment this is especially the case when negative changes of the traffic situation and/or of parking space availability, the routing and/or parking space selection is preferably changed for those vehicles having a remaining longer travel time compared to at least one of the further vehicles.

In one embodiment, an additional vehicle driver occupying his vehicle in a parking space which is selected for the at least one vehicle and to which the at least one vehicle is navigated, is requested by the parking guidance system to approach an additional parking space and is navigated to it in order to make the parking space free at a time corresponding to the requested arrival time at the destination. It is within the scope of the present invention for requests or reservations of parking spaces at different parking areas to be exchanged against each other depending on the predicted space requirements, the parking space utilization and the predicted and/or determined actual traffic utilization of the routes of the vehicles from their respective locations (e.g., origins) to the instructed parking areas (e.g., destinations) suggested by the parking guidance system (e.g., through one or more intermediate points). Thus, in one aspect, the present invention provides an interactive system of parking space selection and routing guidance.

In one embodiment of the method according to the present invention or an embodiment of the parking guidance system according to the present invention, in the case of a selection of parking spaces and a routing thereto for a plurality of vehicles or road users heading for the same destination, those arriving early to parking spaces near the destination are guided to parking spaces further away from the destination than such parking spaces reserved for vehicles arriving later to the parking spaces near the destination. Particularly in the case of a large event, this results in advantages in the form of a spatial equalization of the departure traffic after the end of the large event. This is generally true since, as a rule, the last visitors to events leave first, so that they will have left the parking lots or parking areas with their vehicles before the first visitors.

The invention is explained in more detail below by means of examples of embodiments in connection with accompanying drawings, some of which are highly simplified and at different scales.

BRIEF DESCRIPTION OF THE DRAWINGS

The features and advantages of the present invention will be better understood when the Detailed Description of the Preferred Embodiments given below is considered in conjunction with the figures provided, wherein.

In these figures, like structures are assigned like reference numerals, but may not be referenced in the description for all figures.

DETAILED DESCRIPTION OF PREFERRED EMBODIMENTS

The present invention is described below by way of one or more example embodiments and by referring to the drawing. For example, as described herein the drawings provide a schematic explanation of the method according to the invention for assigning a parking space to a vehicle and correspondingly guiding the vehicle to the parking space, as well as an application and mode of operation of the parking guidance system according to the invention on the basis of exemplary traffic situations.

Figure 1A:
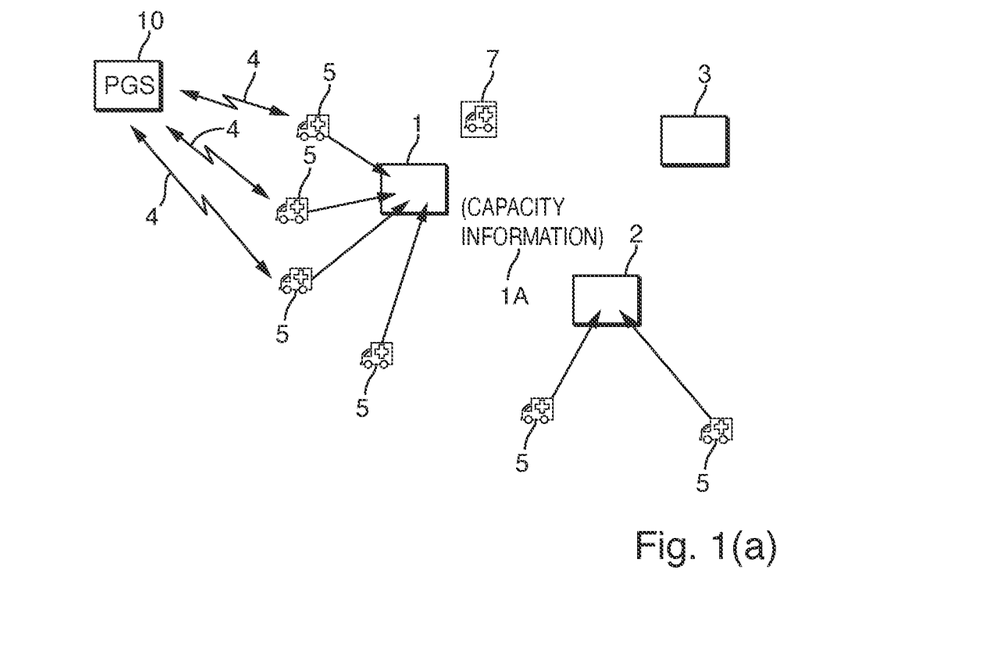
FIGS. 1(a) to 1(d) are simplified schematic diagrams illustrating a parking space occupancy scenario according to a first embodiment of the present invention.

According to FIG. 1(a), a plurality of vehicles 5, 7 for which several parking areas 1, 2, 3 are available in a traffic area, a majority of which vehicles (e.g., the vehicles 5) are connected to a parking guidance system (PGS) 10, in particular in a navigation system (not shown) of the plurality of vehicles 5, by means of, for example, mobile terminals such as smartphones or navigation devices via a radio link 4. In addition to the vehicles 5 connected to the parking guidance system 10, vehicles without a connection to the parking guidance system, as illustrated by vehicle 7, are also on the road. In FIGS. 1(a) to 1(d), the distances and locations are illustrated by the position of the vehicles 5, 7. The length of the arrows indicates the distance of the vehicles 5, 7 from the parking areas 1, 2 from which they are guided to an individual parking space available for them in the parking areas 1, 2, 3 with the help of the parking guidance system 10.

Figure 1B:
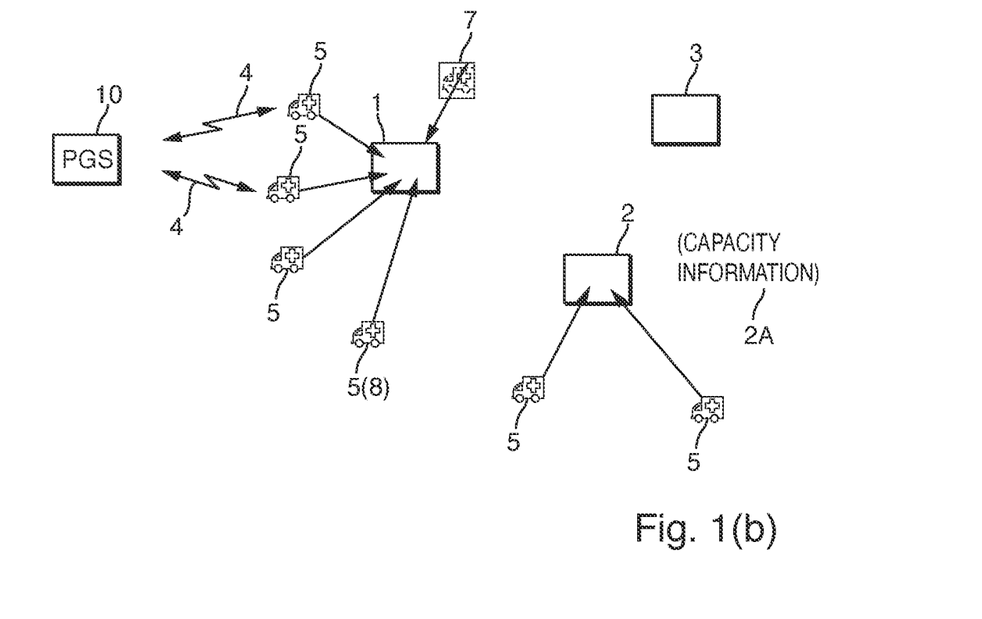
Figure 1C:
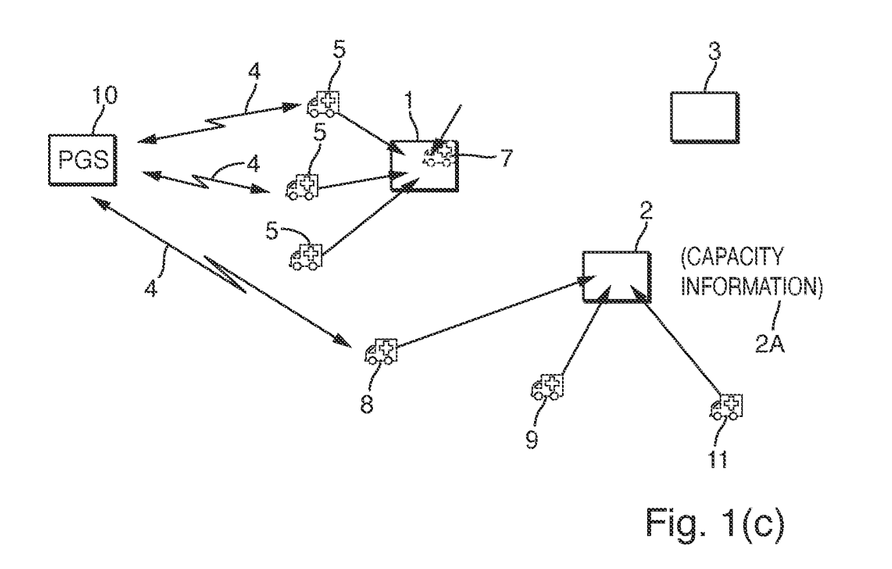

As indicated in FIG. 1(b), it is taken into account that the vehicle 7 is not connected to the parking guidance system 10 and heads for parking area 1 and, as shown in FIG. 1(c), vehicle 7 is the first vehicle to find a parking space there. As parking area 1 is designed for only four vehicles (e.g., capacity information 1A for parking area 1 documents, for example, a capacity of four vehicles), one of the vehicles 5 connected to the parking guidance system 10 is diverted by the system 10 from parking area 1 to parking area 2 in order to be able to obtain a parking space. In one embodiment, a vehicle 8 (formerly vehicle 5, FIG. 1(b)) that is diverted by the system 10 from the route to parking area 1 to a route to parking area 2 is the one vehicle that is the greatest distance from parking area 1. This is because, accordingly, due to the spatial distance, there is sufficient time to look for other parking areas without requiring a significant change of direction for the vehicle 8. For example, a detour of one of the vehicles 5 located closer to parking area 1 to parking area 2 would have led to an increase in the traffic flow density in the area around parking areas 1 and 2 and thus to a worsening of the traffic situation for the plurality of vehicles 5 as a whole. As noted herein, the method and the parking guidance system 10 of the present invention is used to guide at least some road users and vehicles, for example, in a centralized and collaborative manner by finding optimal solutions (e.g., parking space occupancy and route guidance) for the road users and vehicles, as a whole.

Figure 1D:
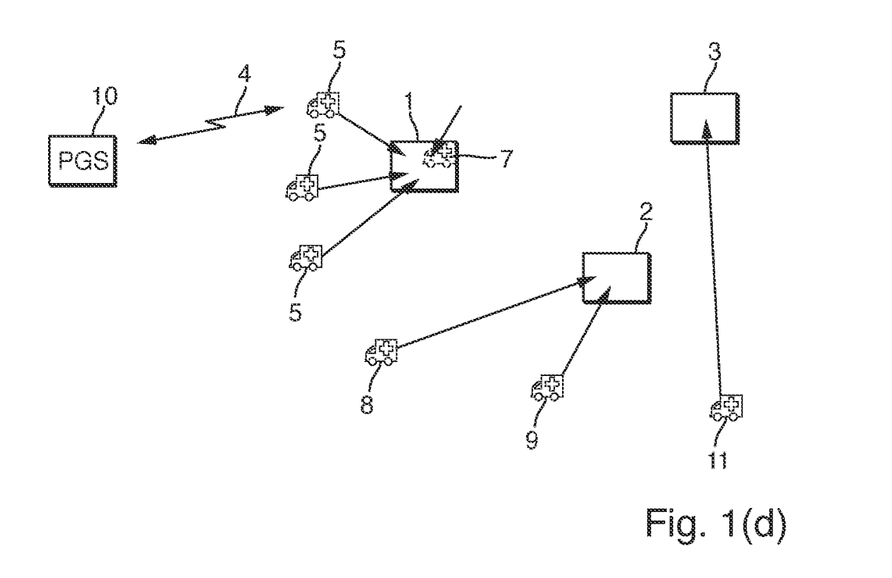

If, as indicated in FIGS. 1(c) and 1(d), parking area 2 is designed to accommodate two vehicles (e.g., has capacity information 2A of two vehicles), the traffic situation around parking area 2 shown in FIG. 1(c) also requires one of the vehicles 8, 9, 11 there to be diverted to another parking area. Here, according to FIG. 1(d), the vehicle 9 closest to parking area 2 and the vehicle 8 already diverted (from parking area 1, FIGS. 1(b) and 1(c)) are assigned to parking area 2. The vehicle 11 is directed to parking area 3 by the parking guidance system 10 and guided there by the navigation system integrated in the parking guidance system 10 with the aid of a predetermined route. In this case, the vehicle 11 is not diverted as being the vehicle furthest away from the parking area 2, but as to the vehicle closest to the parking area 3.

Figure 2A:
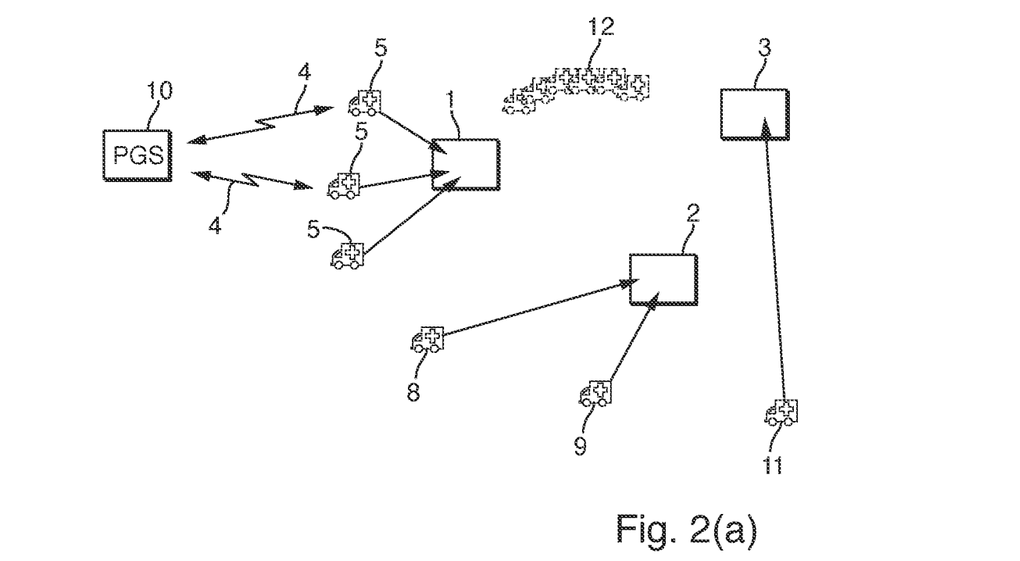
FIGS. 2(a) to 2(d) are simplified schematic block diagram illustrating a parking space occupancy scenario according to a second embodiment of the present invention.
Figure 2B:
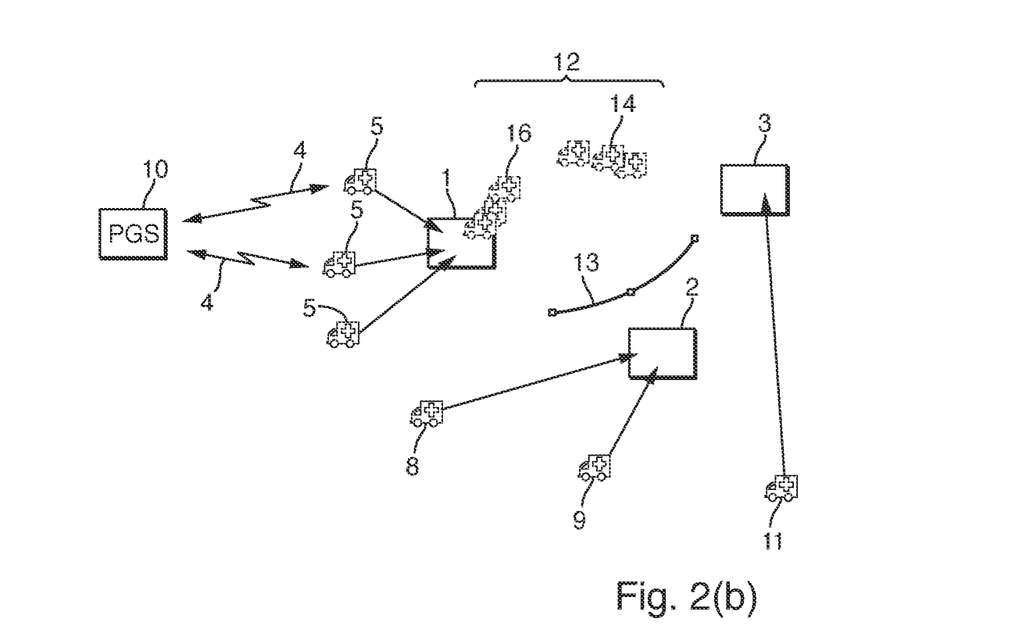

As shown in FIG. 2(a), the behavior of non-traffic-guided vehicle participants or vehicles 12 can be different. Thus, a sub-group 14 of vehicles 12 can remain at their location (in FIG. 2(b)), while at the same time a sub-group 16 of vehicles approaches the parking area 1. According to one embodiment of the present invention, it is intended not only to react to spontaneous behavior of non-controlled vehicles 16, but also to generate an occupancy forecast 13 by the parking guidance system 10 in advance, as indicated in FIG. 2(b). The occupancy forecast 13 indicates the occupancy of the parking area 1 of the parking area 1 over time, e.g., the forecast/predicted number of vehicles anticipated to be parked in the parking area 1. The probability with which the vehicles 14 that initially remain stationary will approach parking area 1 is calculated. In one embodiment, the forecast is based on historic data. In some embodiments, the historic data is based on purchasing behaviour and/or previous traffic along a given route or about a predetermined area at one or more different days and/or times of the week, weather, events, holidays, shopping traffic, and the like, with different traffic patterns. In still other embodiments, the parking guidance system 10 learns correlations in the data, if present.

Figure 2C:
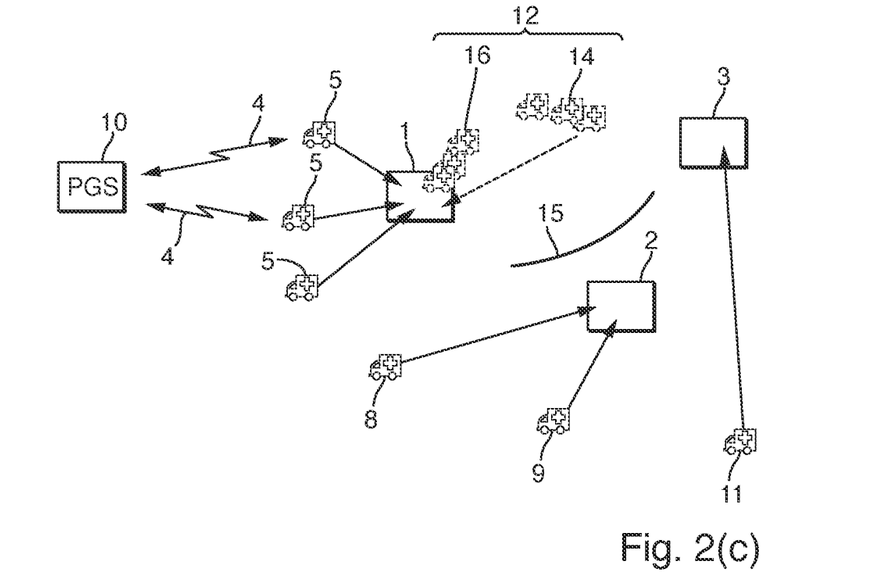

In addition, as shown schematically in FIG. 2(c), an occupancy or utilization curve 15, i.e., an actual occupancy number B versus time t, of parking area 1 is determined. This can be used for further traffic management processes. In one embodiment, as the occupancy or utilization curve 15 indicates that a parking area is approaching its maximum capacity, the parking guidance system 10 may trigger a re-evaluation and/or inspection of the parking area to confirm actual occupancy.

Figure 2D:
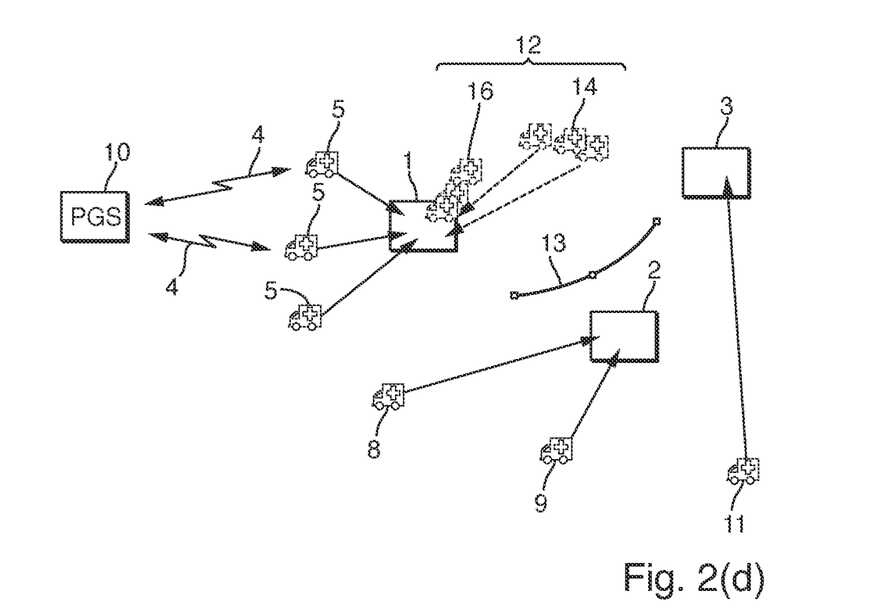

If the group of vehicles 14 not controlled by the parking guidance system 10 moves towards the parking area 1 as shown in FIG. 2(d), the occupancy or utilization forecast 13 of the parking area 1 is adjusted accordingly as it is more probable that one or more of the vehicles 14 will seek parking in parking area 1.

The preparation of such an occupancy forecast 13 and its inclusion in the assignment and routing to a parking area 1, 2, 3 or a parking space therein carried out with the parking guidance system 10 is advantageous in order to be able to implement a corresponding rerouting of the navigation-controlled vehicles 5, 8, 9, 11. Thus, in particular for the distance situations of the navigation-controlled vehicles 5, 8, 9, 11 and the non-navigation-controlled vehicles 12, 14, 16 shown in FIG. 2(d), it is advantageous to take into account a probability of the vehicles 14 seeking the parking area 1 as opposed to a spontaneous seeking of the parking area 1 by the vehicles 14, because otherwise an approach to the parking area 1 by all vehicles 5, 14 would take place simultaneously. Then a detour of the vehicles 5, 14 would have to be carried out under an increased local traffic density with corresponding disadvantages.

In the cases described above and shown in FIGS. 2(a) to 2(d), the traffic situation with an occupancy or utilization forecast 13 of the parking area 1 for behaviours of vehicles 12, 14, 16 not connected to the parking guidance system 10 can be improved within the scope of the invention by calculating it based on additional information. For example, a measured time-of-day dependent occupancy statistic can be used as a basis for the forecast. However, an event calendar with events such as sporting events, in particular soccer matches, music events, concerts, theatre, or opera performances can also be taken into account. In this way, known patterns of vehicle movement can be easily detected and these can be incorporated accordingly into the allocation of a parking space to vehicles communicating with the parking guidance system 10 and their guidance to the parking areas 1, 2, 3.

Figure 3:
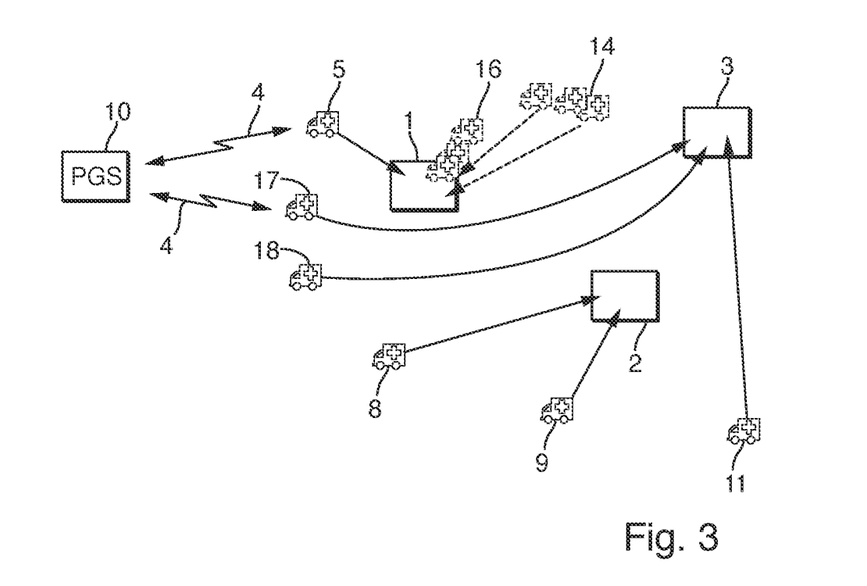
FIG. 3 is a simplified schematic block diagram illustrating a parking space occupancy scenario according to a third embodiment of the present invention.

Thus, as exemplified by FIG. 3, a detour of vehicles 17, 18 to parking area 3 can be initiated at an early stage if it is known that, due to a special event situation, vehicles 14 are very likely to approach and seek parking in parking area 1 and are not connected to the parking guidance system 10.

Likewise, further effects and behavior patterns of road users can be taken into account with the parking guidance system 10 and method according to embodiments of the present invention.

Figure 4:
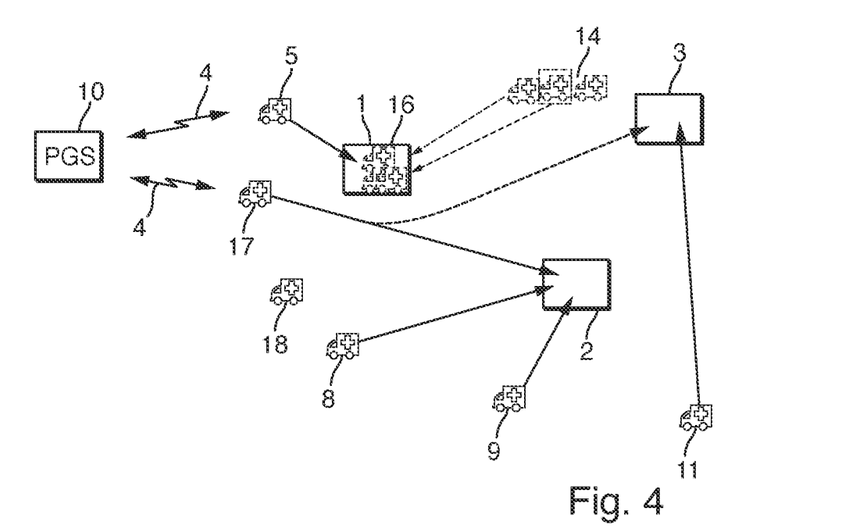
FIG. 4 is a simplified schematic block diagram illustrating a parking space occupancy scenario according to a fourth embodiment of the present invention.

Thus, on the one hand, as indicated in FIG. 4, an exit of the vehicle 18 from the requested parking space allocation situation to the parking area 3 can be observed, in which the vehicle 18 does not continue along the corresponding route and does not visit the parking area 3. It can also be taken into account that, as indicated by vehicle 17 in FIG. 4, drivers do not accept the parking area 3 assigned to them by the parking guidance system and, as indicated by the dashed arrow to parking area 3, do not follow the route to this area 3 but instead head for parking area 2 as illustrated here. However, parking area 2 is already completely occupied when vehicles 8 and 9 arrive and the additional vehicle 17 could no longer be accommodated. Such effects can be taken into account in the allocation or selection situation of parking spaces in parking areas 1, 2, 3 and the corresponding route guidance on the basis of a measured frequency of non-compliance with traffic guidance instructions provided by the parking guidance system 10.

Figure 5:
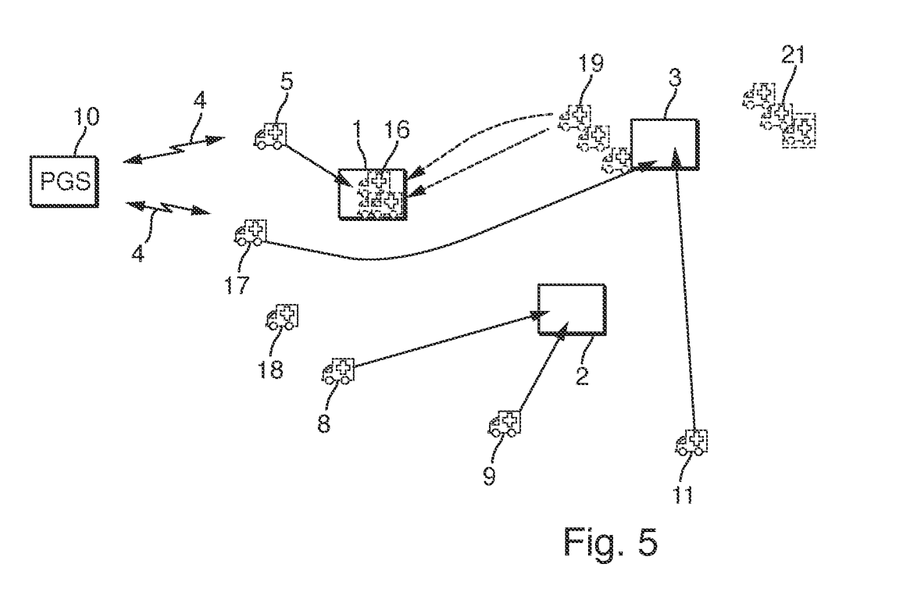
FIG. 5 is a simplified schematic block diagram illustrating a parking space occupancy scenario according to a fifth embodiment of the present invention.

Corresponding effects can also occur if conventional traffic guidance signs are not at a current occupancy level and thus further vehicles 19 or 21, as illustrated in FIG. 5, drive towards parking areas 1 or 3, although these should no longer be available for further vehicles due to occupancy by vehicles 16 or due to ongoing navigation of vehicles 11, 17.

Figure 6A:
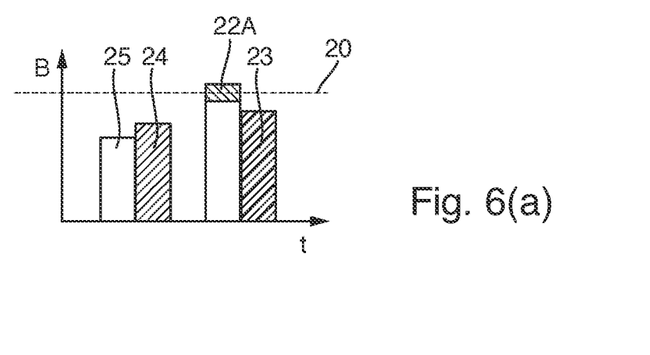
FIGS. 6(a) to 6(c) are occupancy time diagrams illustrating occupancy of a parking space according to embodiments of the present invention.
Figure 6B:
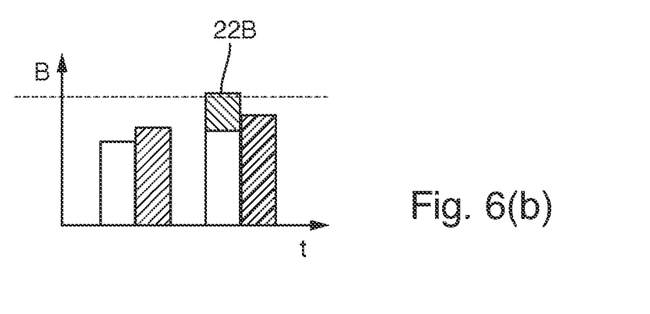
Figure 6C:
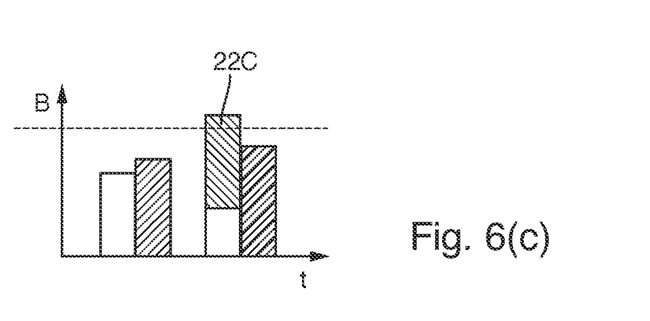

When using the parking guidance system 10 according to embodiment of the present invention or the parking assignment and navigation methods described herein, it is possible to fall back on collected occupancy data, which can be compiled in the form of occupancy time diagrams, as shown in FIGS. 6(a) to 6(c).

According to FIG. 6(a), if an occupancy limit given by the marking 20 is exceeded by a number of vehicles 22A (e.g., shaded portion) in a group of vehicles 22 expected in a time unit Δt, part of this group of vehicles 22 must be diverted to other parking areas. Corresponding reservations at other parking areas must then be made. Even if no further information is available about the traffic behaviour of the users in the group of vehicles 22, a closed parking space occupancy with this group 22 can only be achieved by redirecting participants of other groups 23, 24, 25. The larger the number of vehicles that cannot be accommodated in requesting groups of vehicles 22 (e.g., expanding shaded portions 22A to 22B to 22C) is, the more stable the traffic routing or traffic utilization/load can be preset, as shown in FIGS. 6(b) and 6(c).

Figure 7:
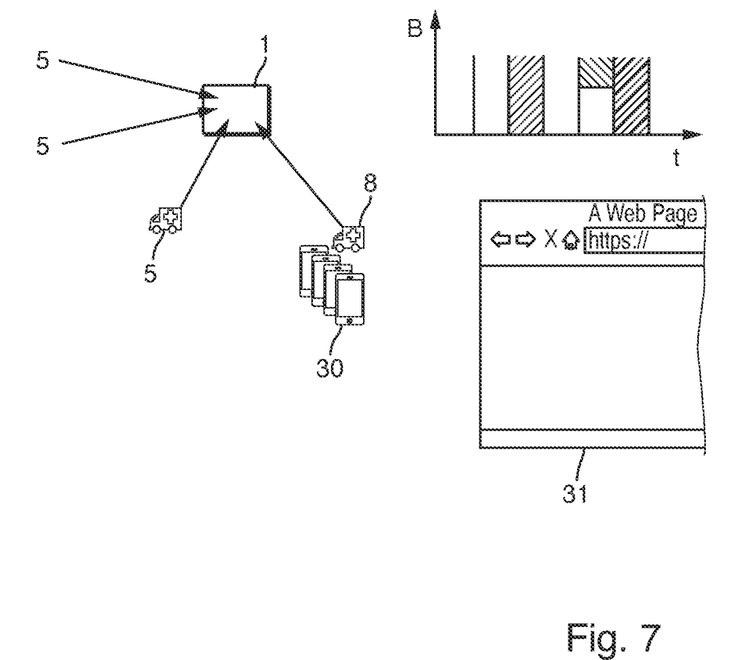
FIG. 7 is a simplified functional representation of the parking guidance system according to one embodiment of the present invention.
Figure 8:
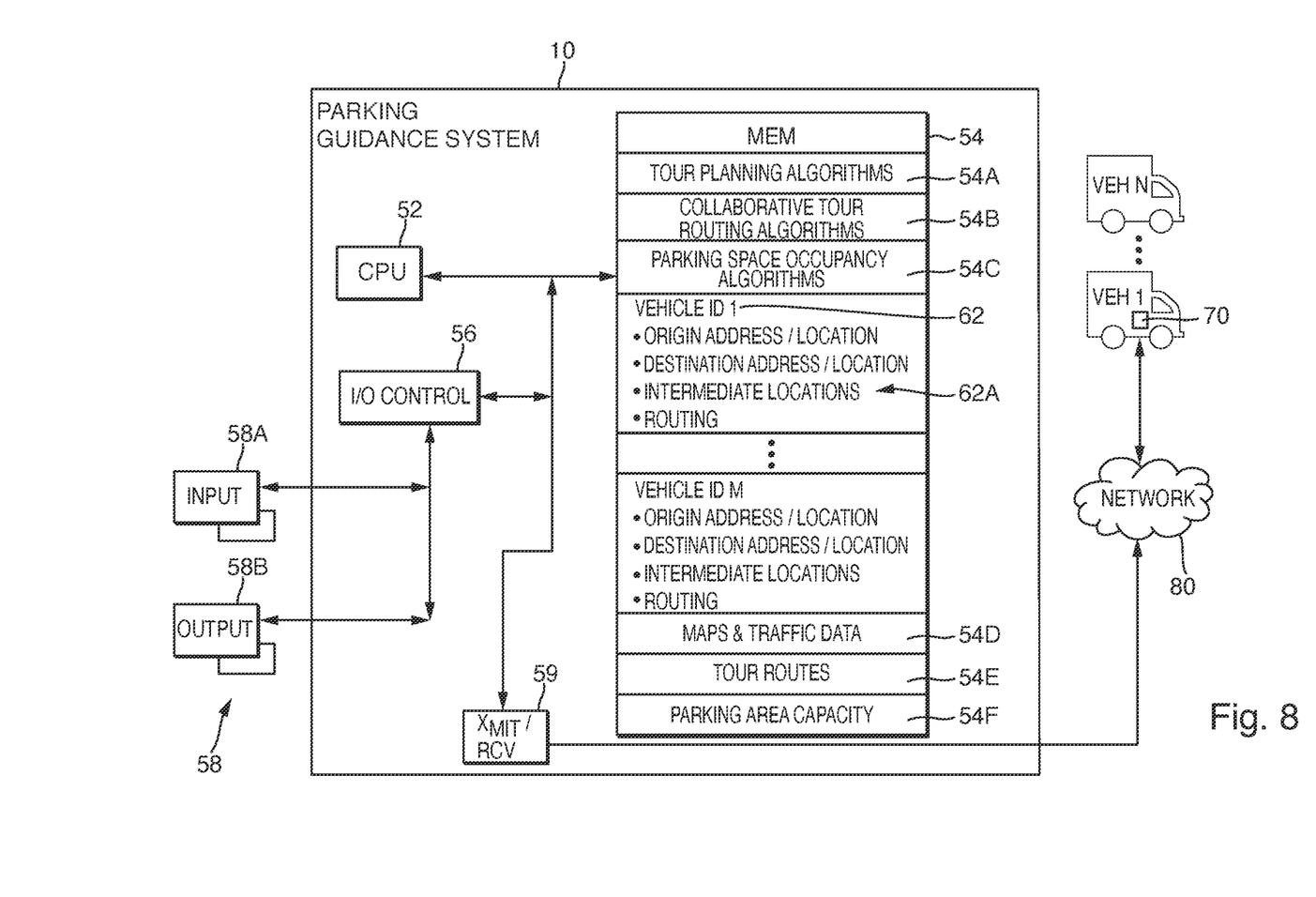
FIG. 8 is a simplified schematic block diagram illustrating hardware components of a computer system configured and operating to execute algorithms, routines, and methods of parking guidance system according to embodiments of the present invention.

As shown in FIGS. 7 and 8, in accordance with one or more embodiments of the present invention, the parking guidance system 10 can be provided on Internet or intranet servers and accessed via radio links or via corresponding LAN or WLAN connections from terminals 30 or displays communicating via these radio links. A central computer unit shown schematically and in terms of software in FIG. 7 manages and calculates allocation models for parking spaces and takes over corresponding navigation of the vehicles 5, 8 on correspondingly calculated routes. For this purpose, an application runs via which control or monitoring mechanisms take place, for example in a browser in the form of web pages 31.

For example, and as shown in FIG. 8, the parking guidance system 10, includes a processor such as a microprocessor or CPU 52, computer-readable storage medium or memory MEM 54, an input-output controller 56 operatively coupled to input and output devices, shown generally at 58, including input devices 58A for facilitating input of data and information to the parking guidance system 10 such as a keyboard, a mouse, touch screen, reader of barcodes (e.g., UPC barcodes), RFIDs, or QR codes, sensors (e.g., at parking spaces), ultrasound, radar, or laser measurement systems, a network of global positioning satellites (GPS) (e.g., providing location and/or position data), optical cameras, or other input device, and output devices 58B for displaying inputted and/or processed data and other information such as a pixel-oriented display device, printer or the like. In one embodiment, MEM 54 stores one or more tour planning algorithms 54A, collaborative tour routing algorithms 54B, and/or parking space occupancy algorithms 54C, executed by the CPU 52 in operation of parking guidance system 10. In some embodiment, the MEM 54 may include, for example, under unique vehicle identification codes 62, data and information of each vehicle (e.g., vehicle IDs 1 to M), as well as origin and/or destination addresses or locations, and intermediate locations, shown generally at 62A. The MEM 54 may also store maps and traffic data 54D, tour routes 54E, parking area capacity information 54F, and other data and information or parameters used in the parking guidance system 10. In one embodiment, the parking guidance system 10 includes a transceiver 59 operatively or communicatively linked to, integrated or connected with, or coupled to, a communications network 80 such as the Internet, an intranet, an extranet, or like distributed communication platform for accessing and/or sending and receiving data, information, requests, commands, and otherwise communicating with one or more external devices such as, for example, one or more of navigation system 70 located in one or more vehicles (VEH 1 to VEH N), for example, the aforementioned vehicles 5, 8, 9, 11, over wired and wireless communication connections (e.g. the radio links 4). It should be appreciated that, in one embodiment, the navigation system 70 includes a similar hardware configuration (e.g., the CPU, the memory, the input-output controller, the input and output devices, and the transceiver) as illustrated in FIG. 8.

Figure 9:
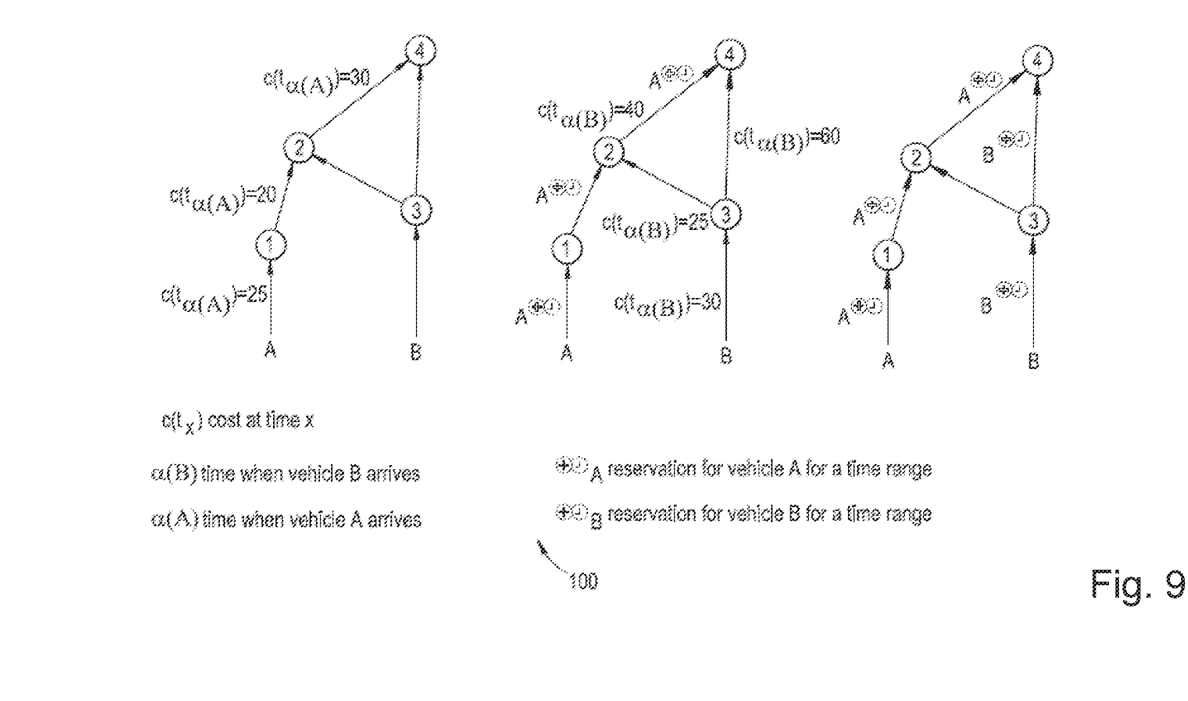
FIG. 9 illustrates operation of the parking guidance system embodied within and executing tour planning, collaborative tour routing, and parking space occupancy algorithms, routines and methods according to embodiments of the present invention.

In one embodiment, illustrated in FIG. 9, the tour planning algorithms 54A, the collaborative tour routing algorithms 54B, and the parking space occupancy algorithms 54C stored in MEM 54 are executed by the CPU 52 of the parking guidance system 10 when making the aforementioned adjustments, modifications, or updates to one or more of the planned routes for one or more vehicles 5, 8, 9, 11 (illustrated generally as A or B in FIG. 9) being guided to parking areas 1, 2, 3 (illustrated as encircled 4) through one or more intermediate locations or points (illustrated as encircled 1, 2, and 3). In this embodiment of the present invention, the algorithms, illustrated generally at 100, predict a cost ($c(t_x)$) at a particular point x in time t for the vehicle A or B to travel from an origin to a destination (e.g., parking space) through the one or more intermediate locations or points along a planned route. The cost ($c(t_x)$) is updated dynamically in real-time for every route segment between the origin, intermediate points (encircled 1, 2, and 3), and destination (encircled 4), using for example, traffic data. In one embodiment, when the algorithms 100 cooperate to assign a route to a vehicle A or B, a request and, optionally a "reservation" is made for the destination parking space and optionally, the road segments on the planned route thereto. As a vehicle travels its planned route, e.g., through intermediate points (encircled 1, 2, and 3) updated future cost for all remaining road segments are made to optimize travel. For example, as illustrated in FIG. 9, when a route is assigned to vehicle A, e.g., through junctions 1, 2 to 4, vehicle B will see an updated future cost for all road segments that includes the reservations for vehicle A at various points. Accordingly, the route for vehicle B is calculated by taking into account the reservation for vehicle A, e.g., noting an increased cost through junction 2 to 4 (30 for vehicle A is now 40 for vehicle B), even before vehicle A gets to junction 2. If vehicle B had been the first to request a route, vehicle B would have been assigned the route through junctions 3, 2 to 4. However, since vehicle A has been given the reservation, the cost for vehicle B through junction 2 to 4 has increased in the time interval since vehicle A is predicted to be traveling on the segment, such that vehicle B is assigned a route through junction 3 to 4 at a lesser cost (90 as compared to 95).

It should be appreciated that the algorithms 100 calculate travel routes to different parking areas with reference to and taking into account the actual and forecasted capacity and occupancy of the parking areas, which may change in real-time. This is described herein as parking space selection that is fed back with the route guidance. For example, within the parking guidance system the selection of a parking space is interrelated with route guidance such that the selection of a parking space and route guidance are in a reciprocal relation. As described herein and as illustrated in FIG. 9, for example, the algorithms 100 use demand to reserve capacity along planned routes, which allows active optimization of routing, as compared to conventional traffic navigation systems which are seen to only react to traffic post-factum. Perceived disadvantages in such conventional systems are that they are seen to merely shift traffic from one street or route to another. By the time the conventional systems detect there is traffic somewhere, it is too late and in fact are seen to have inadvertently contributed to the congestion in the first place.

Although described in the context of preferred embodiments, it should be realized that a number of modifications to these teachings may occur to one skilled in the art. By example, the teachings of the present invention are not intended to be limited to vehicles of any particular type, that is, the present invention is not intended to be utilized by only personal, passenger vehicles or commercial delivery vehicles, as any vehicles can benefit from the described systems and methods that provide collaborative routing planning for allocating a parking space for the vehicle and for navigating the vehicle to the parking space as well as to a parking guidance system for allocating a parking space for the vehicle and for navigating the vehicle to the parking space. While the invention has been particularly shown and described with respect to preferred embodiments thereof, it will be understood by those skilled in the art that changes in form and details may be made therein without departing from the scope and spirit of the invention.

What is claimed is:

1. A method for allocating a parking space for a vehicle and for navigating the vehicle to the parking space, the method comprising:
in response to a request sent to a parking guidance system by at least one vehicle driver for a parking space for his vehicle to reach a destination, which request comprises position data of the vehicle, a corresponding selection of an available parking space is carried out and the available parking space is suggested to the at least one vehicle driver;
a route is determined with the aid of a navigation system assigned to the parking guidance system and is taken from the location of the vehicle at the time of the parking space request to the available parking space; and
the vehicle driver is navigated along the determined route to the available parking space;
wherein the parking space selection and route guidance along the determined route are fed back to one another; and
wherein when an additional vehicle driver occupies with his vehicle a parking space which is selected as the available parking space for the at least one vehicle driver and to which the at least one vehicle driver is navigated, sending by the parking guidance system a request to the additional vehicle driver to approach an additional parking space and the additional vehicle driver is navigated to the additional parking space in order to use the additional parking space at an expected arrival time that the at least one vehicle driver arrives to use the available parking space.

2. The method according to claim 1, further comprising:
detecting with sensors an occupancy state of at least one of a parking space and a parking area containing a parking space.

3. The method according to claim 1, further comprising:
when an arrival time at the destination is specified with the request for a parking space, an estimated arrival time at the available parking space is determined by the navigation system during the route guidance of the vehicle; and
when during the route guidance of the vehicle to the selected available parking space, the availability of the parking space at the estimated arrival time is checked and if the estimated arrival time at the destination exceeds the specified time of arrival at the destination, at least one of the route guidance is changed accordingly by the navigation system and another parking space available at the estimated time of arrival time is selected and the vehicle is navigated to the other available parking space.

4. The method according to claim 1, further comprising:
when an arrival time at the destination is specified with the request for a parking space, an estimated arrival time at the selected available parking space is determined by the navigation system during the route guidance of the vehicle;

when the availability of the selected available parking space at the estimated arrival time is checked and, in the event of non-availability, another parking space is selected by the parking guidance system, an estimated arrival time at the other selected parking space is determined and an availability of the other selected parking space at the estimated arrival time is checked and, in the event of its availability, the vehicle is navigated to the other selected parking space; and
when in the event of unavailability of the other selected parking space, a selection of a further parking space is carried out until a parking space available at the corresponding estimated arrival time is determined.

5. The method according to claim 1, wherein other road users who can be influenced via the parking guidance system and/or are independent of it are taken into account in the selection of at least one of the parking space and the route guidance.

6. The method according to claim 1, wherein additional information from the parking guidance system is taken into account during the parking space selection and the route guidance to the selected parking space, which information comprises at least one of a weather situation, an event calendar, public holidays, size of the parking spaces, occupancy forecasts for parking spaces, utilization curves for parking spaces, traffic situations determined statistically according to day of the week or time of day, and other events.

7. The method according to claim 1, wherein in the case of an allocation of a parking space and a routing the route guidance thereto for a plurality of vehicles during the route guidance to the respectively selected parking space, a remaining travel time is determined and, in the case of negative changes in the traffic situation and/or a changing parking space availability, at least one of the route guidance and the parking space selection is changed primarily for those vehicles which have a remaining longer travel time compared to at least one of the further vehicles.

8. The method according to claim 1, wherein in the case of a selection of parking spaces and the route guidance thereto for a plurality of vehicles or road users heading for the same destination, those vehicles which arrive early at available parking spaces near the destination are guided to available parking spaces which are further away from the destination than such available parking spaces which are reserved for the vehicles arriving later at the available parking spaces near the destination.

9. The method according to claim 1, wherein the navigation system includes collaborative tour routing that calculates a cost of a plurality of segments within the determined route and that optimizes the determined route to minimize cost.

10. The method according to claim 9, wherein the cost is calculated as time to traverse each of the plurality of segments within the determined route and traffic situations encountered therein.

11. A parking guidance system for allocating a parking space for a vehicle and for navigating the vehicle to the parking space, comprising:
a detection unit for detecting an occupancy state of at least one of a parking space and of a parking area;
at least one mobile terminal with which a request from at least one vehicle driver for a parking space for his vehicle to reach a destination can be transmitted to the parking guidance system, which request comprises position data of a location of the vehicle, the parking guidance system being designed for a selection of an available parking space corresponding to the request and for transmitting a selection suggestion of the available parking space to the mobile terminal, and a navigation system which is designed for determining a route and for providing route guidance from the location of the vehicle at the time of the parking space request to the available parking space along the determined route;

wherein the parking guidance system is designed for a parking space selection which is fed back with the route guidance; and wherein when an additional vehicle driver occupies with his vehicle a parking space which is selected as the available parking space for the at least one vehicle driver and to which the at least one vehicle driver is navigated, the parking guidance system sends a request to the additional vehicle driver to approach an additional parking space and the additional vehicle driver is navigated to the additional parking space in order to use the additional parking space at a time that the at least one vehicle driver arrives at the available parking space.

12. A method for allocating a parking space for a vehicle and for navigating the vehicle to the parking space, the method comprising:

in response to a request sent to a parking guidance system by at least one vehicle driver for a parking space for his vehicle to reach a destination, which request comprises position data of the vehicle, a corresponding selection of an available parking space is carried out and the available parking space is suggested to the at least one vehicle driver;

a route is determined with the aid of a navigation system assigned to the parking guidance system and is taken from the location of the vehicle at the time of the parking space request to the available parking space; and the vehicle driver is navigated along the determined route to the available parking space;

wherein the parking space selection and route guidance along the determined route are fed back to one another; and wherein when in the case of a selection of parking spaces and a routing thereto for a plurality of vehicles or road users heading for the same destination, those vehicles which arrive early at available parking spaces near the destination are guided to available parking spaces which are further away from the destination than such available parking spaces which are reserved for the vehicles arriving later at the available parking spaces near the destination.

13. The method according to claim 12, wherein additional information from the parking guidance system is taken into account during the parking space selection and the route guidance to the selected available parking space, which information comprises at least one of a weather situation, an event calendar, public holidays, sizes of parking spaces, occupancy forecasts for parking spaces, utilization curves for parking spaces, traffic situations determined statistically according to day of the week or time of day, and other events.

14. The method according to claim 12, wherein in the case of an allocation of a parking space and the route guidance thereto for a plurality of vehicles during the route guidance to the respectively selected available parking space, a remaining travel time is determined and, in the case of negative changes in the traffic situation and/or a changing parking space availability, at least one of the route guidance and the parking space selection is changed for those vehicles which have a remaining longer travel time compared to at least one of the further vehicles.

15. The method according to claim 12, wherein the navigation system includes collaborative tour routing that calculates a cost of a plurality of segments within the determined route and that optimizes the determined route to minimize cost.

16. The method according to claim 15, wherein the cost is calculated as time to traverse each of the plurality of segments within the determined route and traffic situations encountered therein.

* * * * *